United States Patent

Ganesh et al.

(10) Patent No.: US 6,553,000 B1
(45) Date of Patent: Apr. 22, 2003

(54) METHOD AND APPARATUS FOR FORWARDING NETWORK TRAFFIC

(75) Inventors: Jayasenan Sundara Ganesh, Veradale, WA (US); Greg W. Davis, Spokane, WA (US); Parmajeet Singh, Veradale, WA (US); Timothy Scott Michels, Spokane, WA (US); James E. Cathey, Greenacres, WA (US)

(73) Assignee: Alcatel Internetworking (PE), Inc., Spokane, WA (US)

( * ) Notice: Subject to any disclaimer, the term of this patent is extended or adjusted under 35 U.S.C. 154(b) by 0 days.

(21) Appl. No.: 09/166,609

(22) Filed: Oct. 5, 1998

Related U.S. Application Data (60) Provisional application No. 60/072,697, filed on Jan. 27, 1998.

(51) Int. Cl.[7] .......................... G06F 13/00; G06F 15/73
(52) U.S. Cl. ................. 370/235; 370/389; 370/401; 370/428; 709/238; 709/241
(58) Field of Search ................. 370/235–238, 370/389, 400, 428, 401, 396, 392; 709/230, 232, 235, 238–241, 250, 105, 102; 711/141, 146

(56) References Cited

U.S. PATENT DOCUMENTS

| | | | | |
|---|---|---|---|---|
| 5,386,413 A | * | 1/1995 | McAuley et al. | 370/392 |
| 5,796,944 A | * | 8/1998 | Hill et al. | 709/250 |
| 5,860,136 A | * | 1/1999 | Fenner | 370/396 |
| 6,081,507 A | * | 6/2000 | Chao et al. | 370/235 |
| 6,343,326 B2 | * | 1/2002 | Acharya et al. | 709/238 |
| 6,347,087 B1 | | 2/2002 | Lee | 370/392 |

* cited by examiner

Primary Examiner—Alpus H. Hsu
Assistant Examiner—Afsar M. Qureshi
(74) Attorney, Agent, or Firm—Christie, Parker & Hale, LLP (57) ABSTRACT

A switching device for forwarding network traffic to a desired destination on a network, such as a telephone or computer network. The switching device includes multiple ports and uses a lookup table to determine which port to forward network traffic over. The lookup table includes network addresses that are maintained in ascending or descending order. The lookup table also includes network address that differ in length. Fictitious network addresses may also be added to the lookup table to expedite searches in the lookup table. The fictitious network addresses are used in conjunction with a comparison field stored in the lookup table. The comparison field allows network addresses and collapsed network addresses (which represent groups of network addresses) to be stored within the same table. The collapsed network addresses allows for a reduction of overall lookup table size, thereby increasing the speed while reducing the cost of the switching device.

39 Claims, 9 Drawing Sheets

| ENTRY NUMBER | NETWORK ADDRESS/ COLLAPSED NETWORK ADDRESS | COMPARISON FIELD | PORT |
|---|---|---|---|
| 1 | 19:0:0:0 | 8 | 1 |
| 2 | 44:0:0:0 | 8 | 3 |
| : | : | : | : |
| : | : | : | : |
| 100 | 159:0:0 | 8 | 2 |
| 101 | 159:22:0 | 16 | 6 |
| 102 | 159:22:99 | 24 | 10 |
| 103 | 159:66:123 | 24 | 5 |
| : | : | : | : |
| : | : | : | : |
| 1189 | 188:0:0 | 8 | 3 |
| 1190 | 188:7:0 | 16 | 8 |
| 1191 | 188:44:0 | 16 | 15 |
| 1192 | 188:213:111 | 24 | 14 |
| : | : | : | : |

FIG. 4

| ENTRY NUMBER | NETWORK ADDRESS | COMPARISON FIELD | PORT |
|---|---|---|---|
| 1 | 19:0:0:0 | 8 | 1 |
| 2 | 44:0:0:0 | 8 | 3 |
| ⋮ | ⋮ | ⋮ | ⋮ |
| ⋮ | ⋮ | ⋮ | ⋮ |
| 100 | 159:0:0 | 8 | 2 |
| 101 | 159:22:0 | 16 | 6 |
| 102 | 159:22:99 | 24 | 10 |
| 103 | 159:66:123 | 24 | 5 |
| ⋮ | ⋮ | ⋮ | ⋮ |
| ⋮ | ⋮ | ⋮ | ⋮ |
| 1189 | 188:0:0 | 8 | 3 |
| 1190 | 188:7:0 | 16 | 8 |
| 1191 | 188:44:0 | 16 | 15 |
| 1192 | 188:45:0 | 8 | 3 |
| 1193 | 188:213:111 | 24 | 14 |
| ⋮ | ⋮ | ⋮ | ⋮ |

METHOD AND APPARATUS FOR FORWARDING NETWORK TRAFFIC

CROSS-REFERENCE TO RELATED APPLICATION

This application is based on provisional U.S. patent application Ser. No. 60/072,697, filed Jan. 27, 1998, and entitled "Variable Length Address Search Mechanism."

FIELD OF THE INVENTION

This invention relates generally to networks, such as telephone and computer networks, and, more particularly, relates to routing information through such networks.

BACKGROUND OF THE INVENTION

A network allows two or more parties to communicate with each other. In their simplest form, networks generally include transmission lines and switching devices (e.g., routers, switching routers, switches, etc.). The transmission lines carry signals (e.g., electrical, optical, etc.), while the switching devices are intermediate stations that establish temporary connections between transmission lines. In telephone networks, for example, a caller's line goes to a switching device where the actual connection is made to the called party. In computer networks, devices such as routers receive messages on the network and forward the messages to their correct destinations. Computer networks can be as small as a local area network (LAN) consisting of a few computers, printers, and other devices, or it can consist of many computers distributed over a vast geographical area (e.g., the Internet).

Figure 1A:
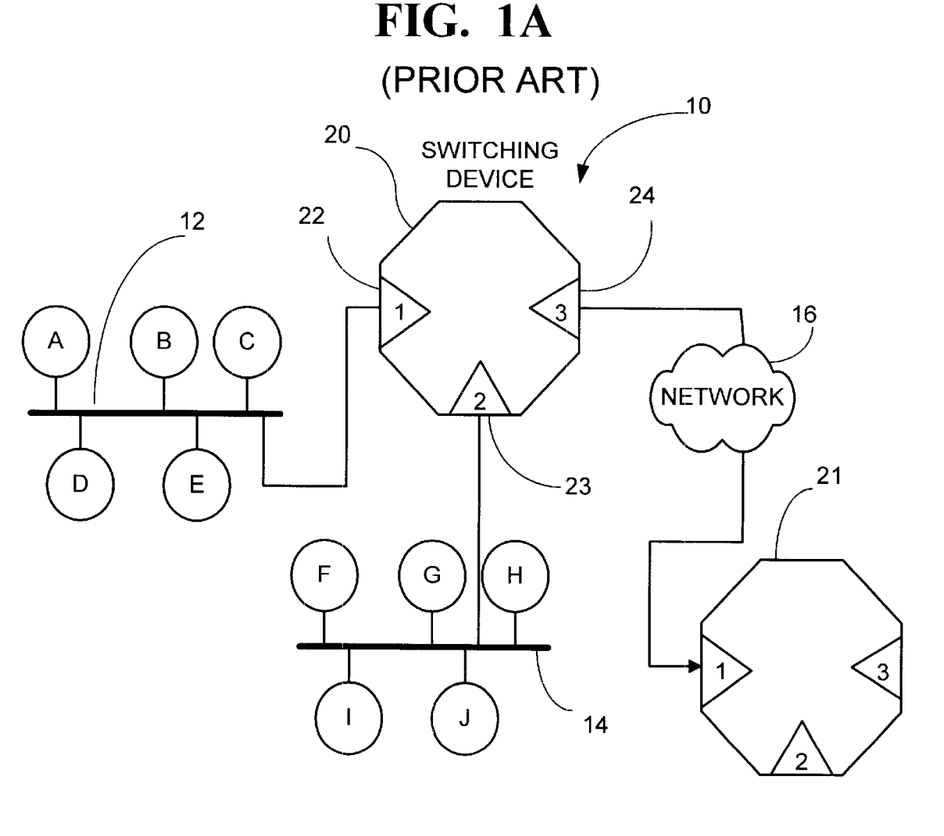
FIG. 1A shows a known network containing multiple segments connected through a switching device.
Figure 1B:
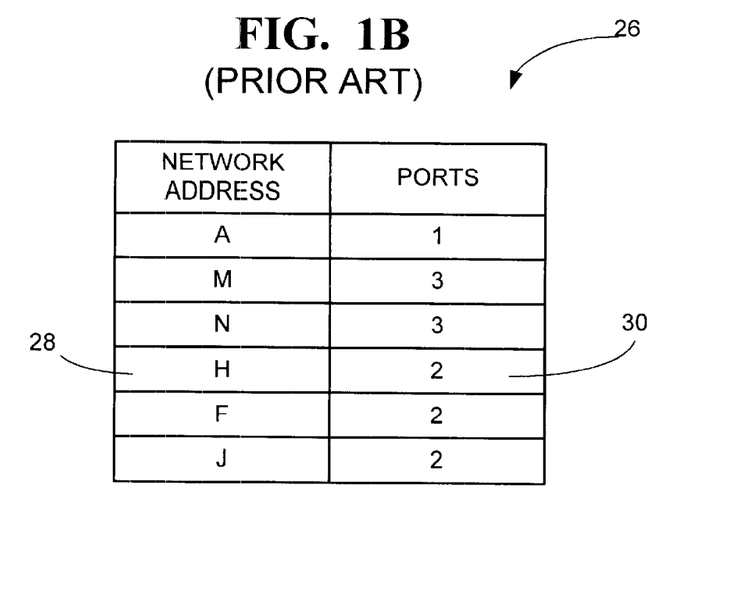
FIG. 1B shows a known lookup table stored in the switching device for identifying nodes connected to the segments.

An example computer network 10 is shown in FIG. 1A. The network includes two local segments 12 and 14, and connection to a remote network 16. Nodes, labeled as A–J, represent computers connected to the local segments. A switching device 20 includes three ports 22–24 and switches network traffic between segments 12, 14, and the remote network 16. Network 16 may also include switching devices, such as switching device 21, which then connects other segments (not shown) to the network. Switching device 20 allows the nodes on one segment to communicate with nodes on other segments and to other switching devices. The nodes communicate with each other through a protocol (e.g., HTTP, TCP/IP, SMB, etc.) which allows the nodes to transmit and receive network frames (a network frame includes a destination address, a source address, and a data field). When switching device 20 receives a frame from a node, it analyzes the destination address by searching a lookup table 26, shown in FIG. 1B. Lookup table 26 includes table entries having a network address field and a port field. When the destination address is matched to a network address in the lookup table, switching device 20 determines which port to forward the frame to by obtaining the port number corresponding to the matched network address. For example, if node A on segment 12 sends a message to node H on segment 14, switching device 20 receives the message from node A and in response searches the entries in the network address field of lookup table 26. Table entry 28 contains the network address for H. A corresponding port field 30 for network address H indicates that the frame should be forwarded over port 2.

The switching device can obtain the network addresses for the lookup table in different ways, depending on the particular implementation of the switching device. For example, the switching device may snoop network traffic so that when a frame is received on a port, the switching device determines if the frame's source address is in the table and, if it is not, adds an entry containing the source address and the inbound port to the table. Thus, the switching device is said to "learn" addresses and port numbers from any frame that is transmitted by a node. Another technique some switching devices, such as routers, use to obtain the lookup table is from other switching devices through a special protocol. Thus, routers supply network addresses to each other to supplement their lookup tables.

The lookup tables may be kept in sorted or random order. Typically, the lookup table contains hundreds of thousands of different network addresses and each address the switching device receives is added to the lookup table indiscriminately. The larger the lookup table, the slower the switching device can search the table, thereby reducing its overall performance. Generally, each address in the lookup table is the same length (e.g., 32 bits for Internet Protocol addresses). If addresses of different lengths are maintained by the switching device, such addresses require separate searches and separate lookup tables, which also reduces the performance and increases the cost of the switching device. Additionally, if the switching device does not find an exact match in the lookup table, it either does not forward the network frame or transmits the network frame on all ports, depending on the particular switching device.

An objective of the present invention, therefore, is to provide a high-speed network switching device that can quickly and efficiently search through address lookup tables and that overcomes the limitations of the prior art.

SUMMARY OF INVENTION

The present invention provides a switching device (e.g., router, switch, switching router, etc.) that forwards network traffic to a desired destination on a network, such as a telephone or computer network. The switching device includes multiple ports and uses a lookup table to determine which port to forward network traffic over. The network traffic is typically in the form of network frames that include source and destination addresses.

In one aspect of the invention, the lookup table includes network addresses that are maintained in sorted order (e.g., ascending or descending order). By ordering the network addresses, a search engine can efficiently search the lookup table to find a network address in the table that matches a destination address in the network frame.

In another aspect, the lookup table includes both network addresses and collapsed network addresses. A collapsed network address represents a group of network addresses. Collapsed addresses are useful when a switching device does not know an exact address, but knows that the address is a member within a group. The sorted ordering also allows for efficient searching of collapsed network addresses and network addresses when an exact match is not found. For example, when an exact match fails, the switching device searches the collapsed addresses and network address by using a comparison field that the search engine applies to the destination address in the network frame. The comparison field can include mask bits that mask a portion of the destination address or a length value that indicates the bits that should be compared. In the case of mask bits, the masked destination address is compared to the network address of the current table entry. If there is a match, then port information is obtained from the current table entry and the network frame is forwarded to that port. For example, when the table is in ascending order, the search engine starts from a point where the search failed and analyzes each table entry in descending order. The mask bits are applied to the destination address and compared to the table entry. If the masked destination address matches the table entry, then the search is complete. If not, the next table entry in descending order is analyzed. This process continues until a match is found or the end of the table is reached. A similar technique may be used for a length value instead of the mask bits. Alternatively, a combination of mask bits and a length value may be used. Additionally, the length value and/or mask bits may be applied to the lookup table entry.

In yet another aspect of the invention, the lookup table includes network addresses that differ in length. The addresses can be virtually any desired length of bits. Additionally, only one search is performed on the lookup table, despite the differing address lengths. The ability to store and search multiple address lengths in the lookup table allows the switching device to work efficiently with different types of networks having different data frames formats.

In still yet another aspect, fictitious network addresses are added to the lookup table to expedite searches performed by the search engine. The search engine inserts a fictitious network address at the point where the search failed. The fictitious network address is chosen so that the sorted order of the table is maintained. Information, such as the port number, from the table entry having a network address that matched the masked destination address (or the destination address with the length value applied) is copied into the table entry for the fictitious network address.

These advantages and other advantages and features of the inventions will become apparent from the following detailed description, which proceeds with reference to the following drawings.

DETAILED DESCRIPTION OF AN ILLUSTRATIVE EMBODIMENT

Figure 2:
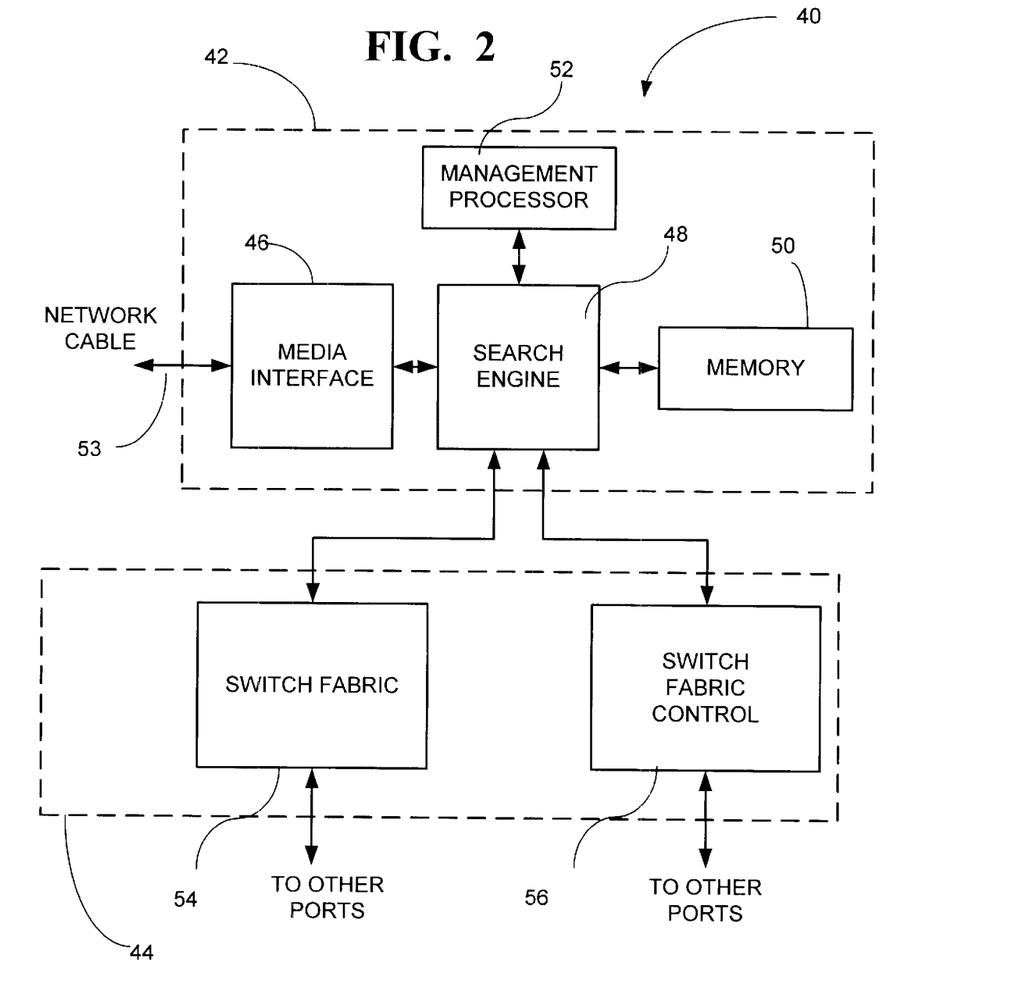
FIG. 2 shows a switching device according to the invention including a search engine and a memory.

FIG. 2 shows a switching device 40 having a port 42 and port intercommunication logic 44. A switching device as defined herein includes switches, switching routers, routers, telephone switches, and any switches now in use or later developed. Port 42 includes a media interface 46, a search engine 48, a memory 50, and a management processor 52. There are multiple ports (not shown) in switching device 40. One or more ports are located on channel cards (not shown) mounted in a chassis. The number of ports and how the ports and port intercommunication logic 44 are mounted within a chassis are based on the particular application and are not important to the invention.

Media interface 46 connects switching device 40 to a network (not shown) through a network cable 53. The network cable can take a variety of forms (e.g., fiber optic, twisted-pair, coaxial, etc.) depending on the type of network. A variety of network standards and protocols may be used, such as TCP/IP, IPX/SPX, FDDI, ATM, ETHERNET, GIGABIT ETHERNET, FAST ETHERNET, Token Ring, SONET, etc. Other network protocols, standards, and network cables now existing or later developed may be used with the invention, since these particular aspects are not important to the invention. Media interface 46 is a communication link between search engine 48 and the network. Thus, media interface 46 allows search engine 48 to send network frames in any desired format and media interface 46 reformats the frames for the particular network. Similarly, media interface 46 receives network frames from the network and formats the frames so they may be read by search engine 48. The media interface used is based on the particular application and is not important to understanding the invention.

Figure 3:
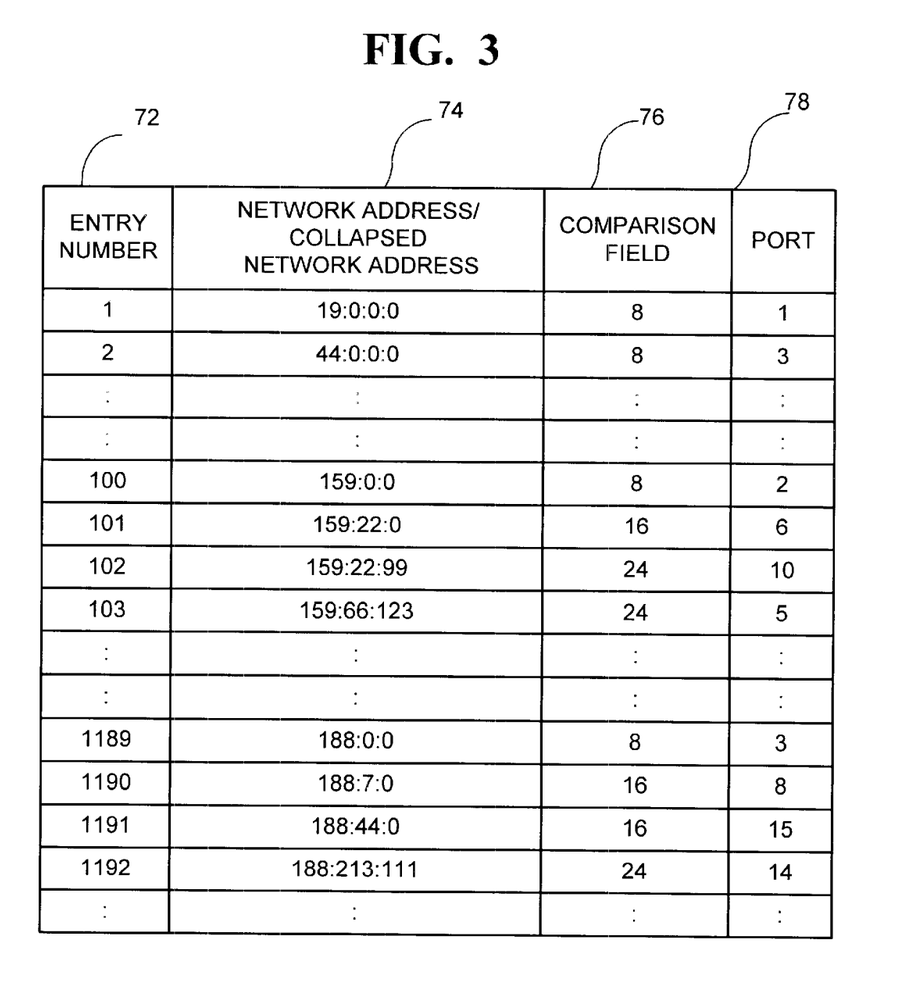
FIG. 3 shows an example of a network address lookup table stored in the memory of FIG. 2, according to one aspect of the invention.
Figure 4:
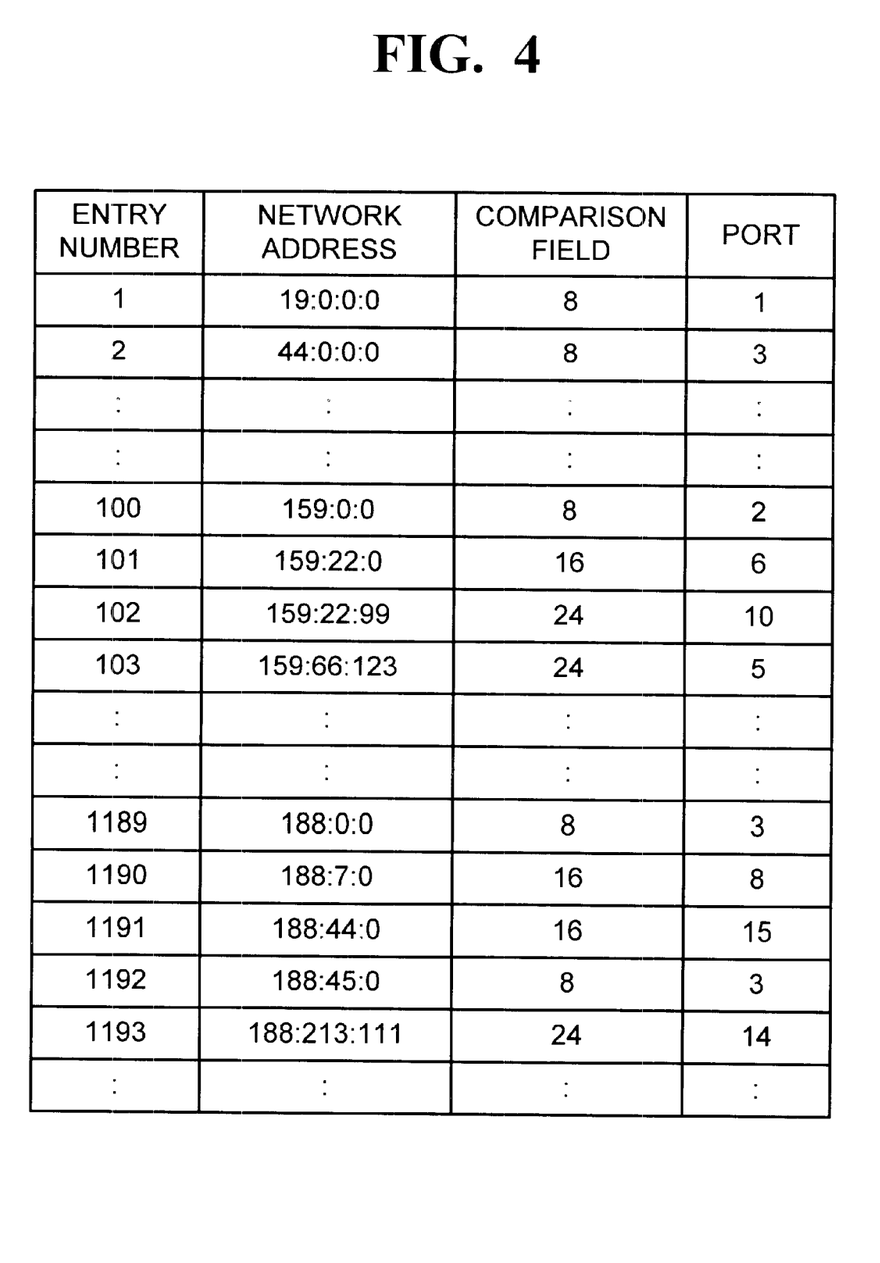
FIG. 4 shows the network address lookup table of FIG. 3 with a fictitious address inserted at entry No. 1192, according another aspect of the invention.

Search engine 48 is coupled to a memory 50. Memory 50 stores a lookup table that search engine 48 uses for analyzing network frames received from media interface 46. Example lookup tables are shown in FIGS. 3 and 4 and are further described below. A management processor 52 and the search engine 48 jointly maintain the lookup tables in memory 50. Specifically, the management processor may direct the search engine to delete old table entries, insert new table entries and generally maintain the tables in sorted order so that the search engine performs searches efficiently. The management processor is also described more fully below.

When search engine 48 determines that a frame is to be forwarded to other ports in switching device 40, it passes the network frame to the port intercommunication logic 44. Port intercommunication logic 44 includes a switch fabric 54 and a switch fabric control 56. Switch fabric 54 can take a variety of forms. For example, the switch fabric can be a cross-bar switch, which is commonly used in telecommunications switching. The cross-bar switch creates a path between a receiving port and a transmitting port so that the network frame may be passed therebetween. A wide variety of cross-bar switches may be used, such as cut-through switches, interim cut-through switches, and store-and-forward switches. Other types of switch fabrics may also be used. For example, switch fabric 54 may also be a central memory using a bus arbitration device and a central bus. Using a shared-memory bus architecture, all ports access a memory pool located locally on a switching module or work group switch. The ports can access the central memory through a common bus when arbitration device grants it access. Another possible switch fabric that can be used is a parallel access shared-memory architecture. In a parallel access shared memory, all ports share the central memory. However, a bus arbitration scheme is not used. Instead, every port has a dedicated path into and out of the central memory fabric. Therefore, all ports can simultaneously access the centralized memory pool at any time. A wide variety of existing switch fabrics or later developed switch fabrics may also be used. The particular switch fabric and switch fabric control is not of importance to the invention. Indeed, in certain applications of the present invention, the switch fabric control and switch fabric may even be excluded.

Switch fabric control 56 controls network frames as they are passed through the switch fabric. In the case where the switch fabric is a cross-bar switch, the switch fabric control is typically called a scheduler. The scheduler establishes a connection within the cross-bar switch so that a search engine on one port can directly pass a network frame to a search engine on another port. In the case where the switch fabric is a memory, the switch fabric control tells a receive-side search engine where to store the frame in memory. After the frame is stored in memory, the switch fabric control signals a transmitting-side port that the network frame is ready to be transmitted and provides the address of the memory location where the frame in located. The switch fabric control may also provide priority information to the transmitting-side port.

Figure 5:
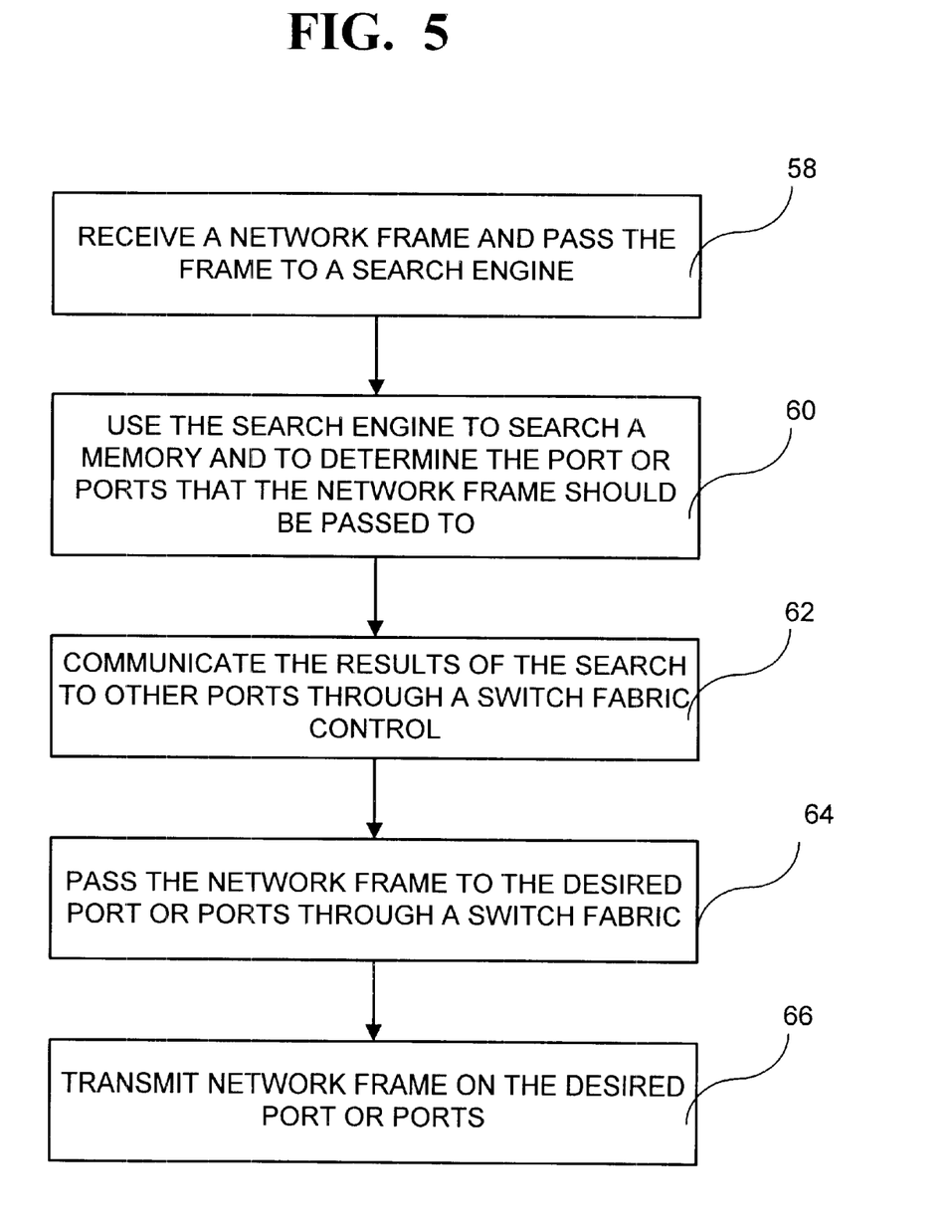
FIG. 5 is a flowchart of a method for forwarding network frames in the switching device of FIG. 2.

FIG. 5 shows a flow chart of a method used by the switching device 40 for forwarding network frames. In step 58, the media interface 46 receives a network frame from the network and passes the frame to search engine 48. The network frame contains a destination address that indicates the ultimate destination for the network frame. In step 60, search engine 48 searches memory 50 to determine whether the destination address from the network frame is located within the lookup table of memory 50. If a network address matches the destination address, a port that the frame should be forward to is also obtained from the lookup table, as is further described below in relation to FIGS. 3 and 4. Assuming that the destination address was properly found in the lookup table and the appropriate port was determined, the search engine passes the search results to switch fabric control 56 (step 62). In step 64, search engine 48 transfers the network frame through switch fabric 54. If the switch fabric is a cross-bar switch, the switch fabric control 56 establishes the connection in the switch fabric and communicates to search engine 48 when to send the network frame. If the switch fabric is a central memory with or without bus arbitration, the switch fabric control tells search engine 48 where in the switch fabric to store the network frame. Search engine 48 then stores the network frame at the indicated location. The switch fabric control also informs the other ports of where the network frame is stored so that they may properly access it within the switch fabric. Regardless of the technique used with the switch fabric, the network frame is obtained from the switch fabric and transmitted on one or more ports (step 66).

Turning briefly to FIG. 3, an example lookup table is shown. The lookup table includes multiple table entries, as shown by entry numbers in column 72. The table entries include a network address field, shown in column 74, a comparison field, shown in column 76, and a port field, shown in column 78. One or more of these columns may be deleted, or alternatively, additional columns may be used. Additional columns may, for example, show a priority status associated with the network address. Network address field 74 includes network addresses and collapsed network addresses. A network address uniquely identifies a destination to transmit the network frame to, such as a computer on a network. A collapsed network address represents a group of addresses. Both the network addresses and collapsed network addresses are shown as including 8 bit sections separated by colons. Thus, each section is shown as a byte.

However, it will be recognized that the addresses can be any desired length and not merely increments of bytes. An example of a network address is 99:4:3:100. This address is four bytes in length and represents a unique destination on the network. An example collapsed network address is 99:4:3:0 and represents a group of addresses from 99:4:3:0 through 99:4:3:255. The collapsed network address is represented by an address and the comparison field. The comparison field is applied starting with the left most numbers of the address and passes numbers within its scope. The comparison field can include mask bits that screen a portion of an address that the mask is applied to or a length value that indicates how many bits of the address should be used for comparison. For example, a mask of 32 bits means the upper 4 bytes of the address are valid and the remaining numbers are zero. A mask of 8 bits means only the first byte of the address is valid. There are numerous ways to mask data. Masking is typically performed by using a logical operator, such as AND, NAND, OR, and NOR etc., to combine the mask and the data value. For a length value, a length of 16 means the upper 2 bytes of the address are used as a comparison. Thus, with a length value, no masking occurs. The particular comparison type used with the network and collapsed addresses is not of importance to the invention. Although the comparison field is generally described and shown in byte increments, it will be recognized that the comparison field can be any number of bits (e.g., 7 bits or 19 bits). Additionally, although the comparison field describes which bits to pass, it can alternatively describe what bits not to pass. For example, a comparison field of 16 bits can be applied to an address from right to left to indicate that the last two bytes are to be screened or otherwise not used for comparison purposes.

The lookup table according to the invention can have network addresses and collapsed network addresses of any length. For example, table entry 1 and 2 have network addresses that are 32 bit addresses, while other table entries are only 24 bit addresses. The different length addresses do not need to be grouped together, but can be intermingled throughout the table. Additionally, a single search is performed on all the lengths. Any size address can be stored in the lookup table and the invention is not limited to particular sizes. By contrast, prior lookup tables are believed to have addresses of only one length or require multiple searches and multiple tables. Of course, particular aspects of the present invention can be used while having all addresses of one size in the lookup table, if desired.

Another feature of the lookup table is that the addresses are maintained in sorted order. In particular, the addresses of FIG. 3 are shown in ascending order. The addresses may also be maintained in descending order. As is further described below, maintaining the addresses in order allows for efficient searching of collapsed network addresses and application of the comparison field.

Figure 6:
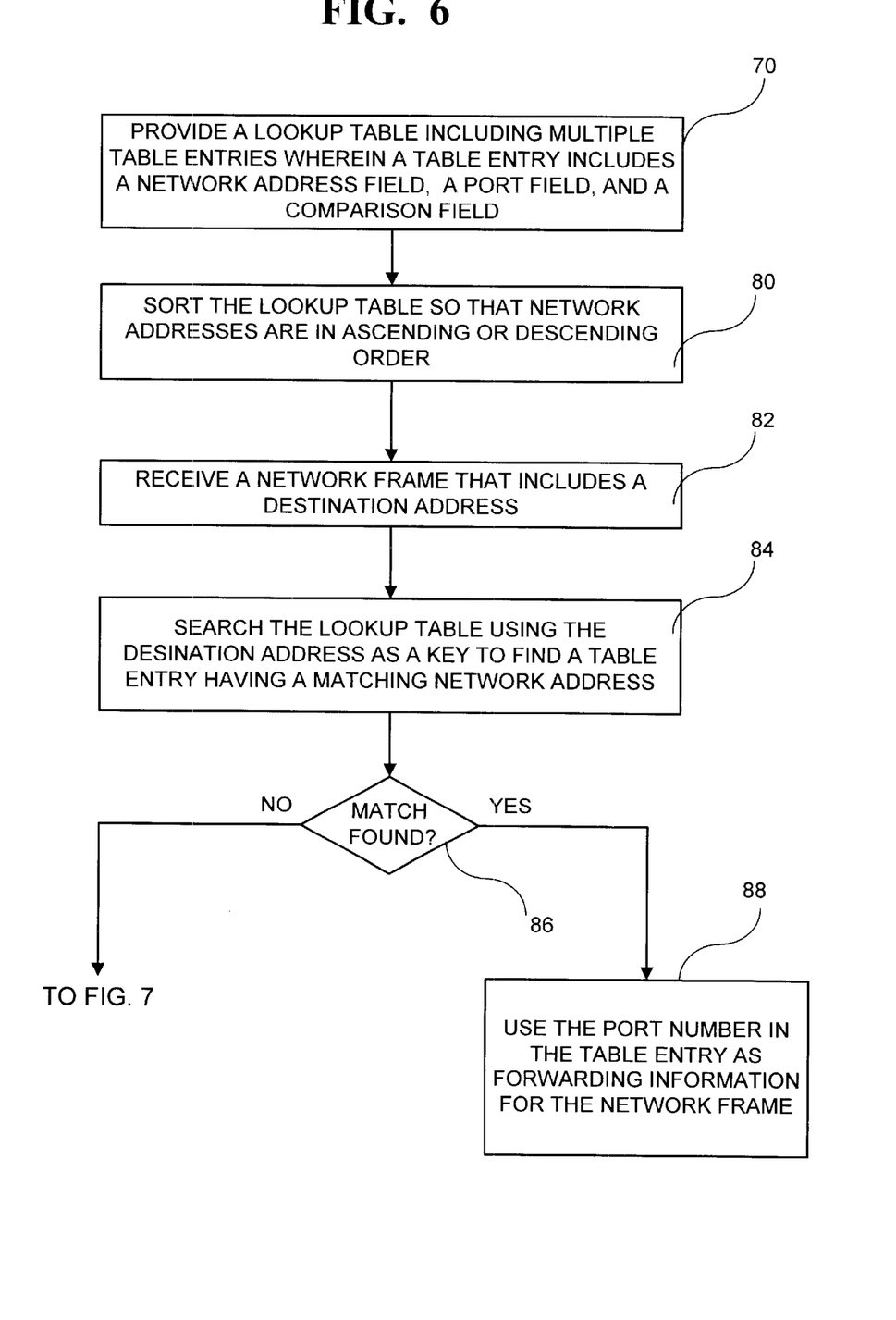
FIG. 6 is a flowchart of a method for organizing and searching a look-up table stored in the memory of FIG. 2.
Figure 7:
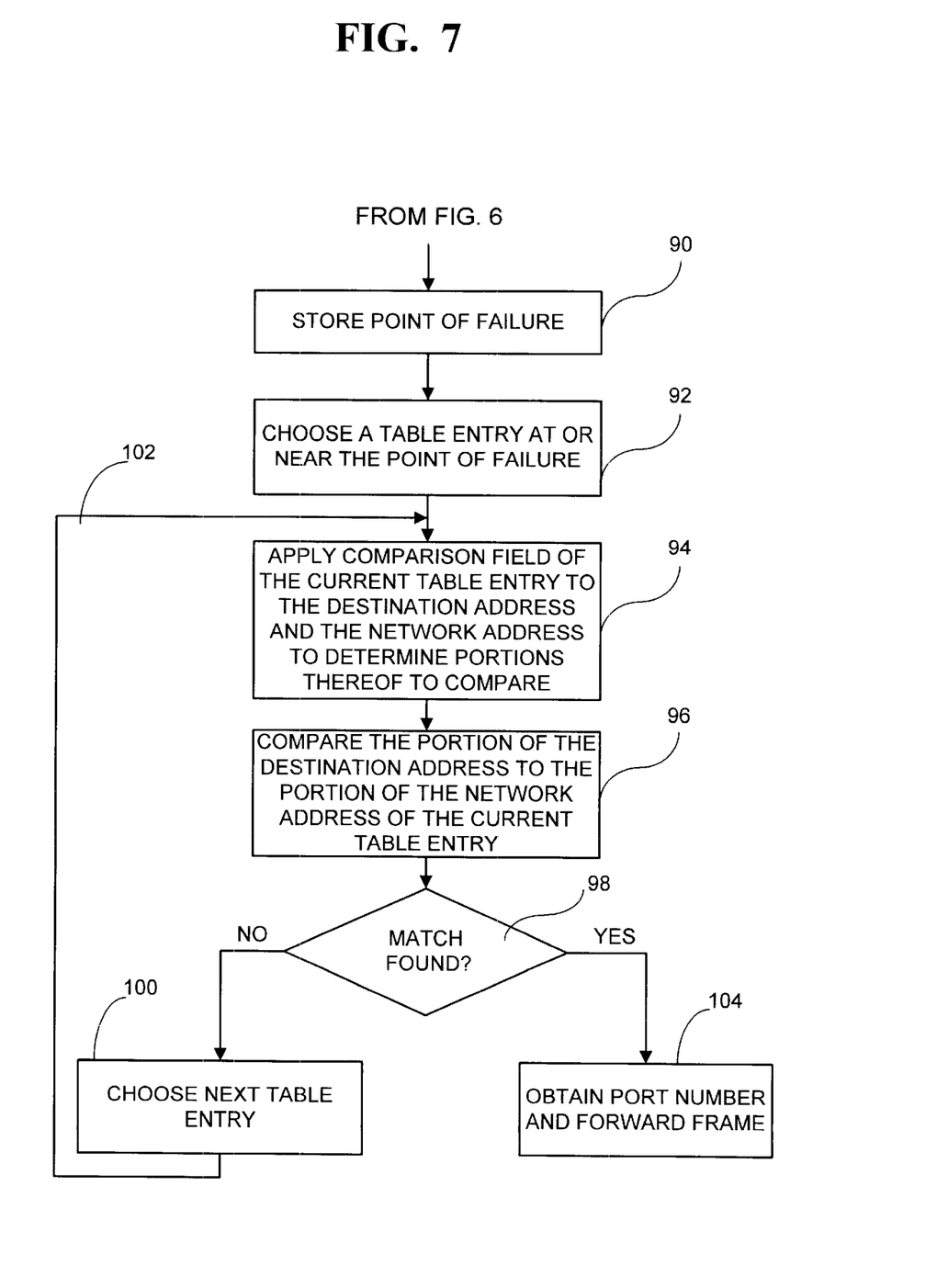
FIG. 7 is a flowchart of a method for further evaluating network addresses when an exact match was not found in the method of FIG. 6.
Figure 8:
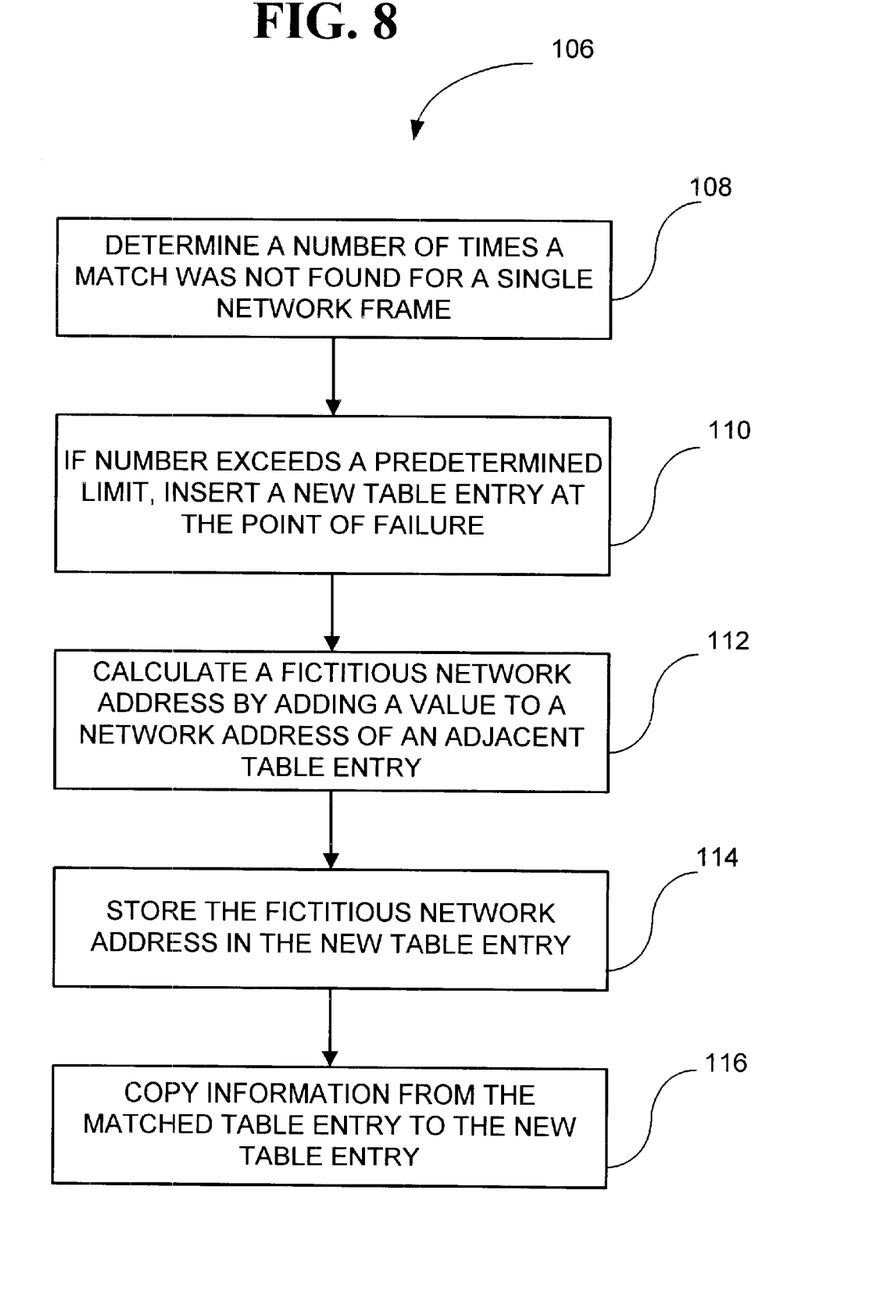
FIG. 8 is a flowchart of a method for inserting a new table entry containing a fictitious network address into the lookup table.

FIGS. 6, 7 and 8 provide further details of how the search engine 48 searches through the lookup table found in memory 50. First turning to FIG. 6, in step 70, a lookup table is provided that includes multiple table entries. In step 80, the lookup table is sorted so that the network addresses are in ascending or descending order. In the example of FIG. 3, the network addresses are shown in ascending order. This sorting process is implemented by management processor 52. In some switching devices, the management processor monitors or "snoops" network addresses that are transmitted and received over the network. Such snooping is typical in switches that analyze layer two and layer three network addresses according to the OSI reference model. Through this snooping process, the management processor obtains the addresses and port numbers for nodes on the network. The management processor then updates the lookup table by asking the search engine to insert a new table entry at an appropriate position so that the ordering of the addresses is maintained. In other types of switching devices, the management processors of different switching devices communicate through a special protocol. Using this protocol, the switching devices transmit network addresses that they are aware of to other switching devices. Such switching devices analyze layer three network addresses according to the OSI reference model and examples include switching routers and routers. When a switching device receives new network addresses, it intelligently updates its lookup table by checking each address to see that it is not already present in the lookup table, and by populating new network addresses into the table in sorted order.

In step 82, a network frame is received by media interface 46 and passed to search engine 48. The network frame includes a destination address indicating the ultimate destination that the frame should be sent to, a source address of where the frame was transmitted from, and data that is being transmitted.

In step 84, search engine 48 searches the lookup table using the destination address as a key for searching the network address field of the lookup table entries (See FIG. 3). In step 86, the search engine checks whether an exact match is found between the destination address of the network frame and a network address within the look-up table. If an exact match is found, step 88 is executed to forward the network frame to the desired port. This forwarding includes reporting the results of the search to the switch fabric control and passing the network frame to the switch fabric. For example, if the destination address is 159:22:99, the search engine searches the lookup table (see FIG. 3) for the same address in the network address field 74 of the table entries. Entry number 102 has such a network address, so an exact match is found. The same table entry 102 also has a port field indicating that port 10 is the proper port to transmit the network frame. The search engine then forwards this port information to switch fabric control 56. In the case where the switch fabric is a cross-bar switch, the switch fabric control sets up the cross-bar switch and tells search engine 48 when to transmit the network frame. In the case where switch fabric 54 is a central memory, switch fabric control 56 signals the ports that port 10 is to transmit the network frame. The switch fabric control also instructs search engine 48 and port 10 where the information should be stored in switch fabric 54. Thus, search engine 48 stores the network frame in the switch fabric and port 10 reads the information from the switch fabric and transmits the network frame.

If no match is found in step 86, further steps shown in FIG. 7 are implemented. In Step 90, a point of failure is stored. For example, suppose a destination address of 188:99:0 was received in a network frame. The lookup table of FIG. 3 does not contain an exact match for address 188:99:0, so the search fails between entry Nos. 1191 and 1192. Some systems may also consider the point of failure to be entry number 1191 or entry number 1192. Whatever point is considered the point of failure, it is stored in step 90. In step 92, a table entry at or near the point of failure is used as a starting point. Returning to the example of FIG. 3, the table entry adjacent to the point of failure is entry No. 1191. As is described further below, the table is further analyzed in a second search wherein the table is searched in descending order from the point of failure until a match is found or the beginning of the table is reached. In step 94, the comparison field from the current table entry being analyzed is applied to the destination address and the network address. The comparison field can be a length field or mask bits. In the case where the comparison field includes mask bits, for entry No. 1191, the mask bits in field 76 are 16 bits. These mask bits are applied to the destination address 188:99:0 and the network address 188:44:0 at table entry 1191. The 16-bit mask field is applied to these addresses starting from left to right. Thus, the masked destination address is 188:99:0 and the masked network address is 188:44:0. The two masked addresses are then compared (step 96). Step 98 checks if these two addresses match. If they do not match, another table entry is chosen (step 100). For example, where the table is ascending order, the next table entry is continued in descending order from the point of failure—thus, entry No. 1190. As indicated by arrow 102, the steps 94, 96, and 98 are again performed on table entry 1190. The mask bits of 16, when applied to the destination address, yields a masked destination address of 188:99:0, and when applied to the network address 188:7:0 yields a masked network address of 188:7:0. These masked addresses are compared and no match is found. In step 100, entry No. 1189 is used as the next table entry. This time, the mask bits of 8 are applied to the destination address and the result is 188:0:0 (a length value of 8 results in 188). The mask bits of 8 are also applied to the network address for table entry 188:0:0 which results in an address of 188:0:0. Since these two masked addresses match, step 98 is answered in the affirmative, and the corresponding forwarding information (e.g., port number) for table entry 1189 (i.e., port 3) is sent to the switch fabric control (step 104). As described above, the comparison techniques and search technique may differ based on the implementation. The example just described is one possible way to carry out the search. Others may also be used. For example, the comparison field may be applied to only the destination address. In sum, the current table entry being analyzed is table entry (X–N) where N is a series (0, 1, 2, . . . ). Table entry (X) represents the starting point of the search. For tables in descending order, the current table entry being analyzed is table entry (X+N) where N is a series (0, 1, 2 . . . ). By performing a search for collapsed network addresses using the mask bits, the switching device forwards network frames even when an exact match is not found. In so doing, the switching device determines the port that is most likely to deliver the network frame to its final destination. The network frame is then picked up by other switching devices that have a higher likelihood of having an exact match with the destination address. By maintaining the addresses in sorted order, the search engine can quickly determine the approximate location of where the network frame should be forwarded. By analogy, the search engine does not know the exact address where to forward the network frame to, but using the sorted order of the lookup table, it can readily find the neighborhood of where the address resides. The search engine can search the lookup table using binary, sequential, CAM searches, etc. The particular searching algorithm is not of importance to the invention. Additionally, although the above-described example includes a table sorted in ascending order and applying the second search in descending order, the method can also have the table sorted in descending order. In such a case, the second search is performed in ascending order starting from the point of failure.

FIG. 8 shows a flow chart 106 of a method for inserting new table entries into the network table to expedite the searching process. In step 108, management processor 52 monitors to see the number of steps needed to match an address and determines the number of times a match was not found during the search described in FIG. 7. There are numerous ways to accomplishing this determination, such as storing a count of the number of times step 100 (FIG. 7) is executed. In step 110, if the number calculated in step 108 exceeds a predetermined limit (e.g., two, three, four, etc.), a new table entry is inserted into the lookup table at the point of failure. Thus, returning to the example described above, a new table entry is entered between entries 1191 and 1192 in FIG. 3. In step 112, a fictitious network address is calculated by adding a value to a network address of an adjacent table entry. The specific value added is not important to the invention. One example of a fictitious address is the address 188:45:0. Another example of fictitious network address is 188:44:1. Other network addresses can also be used but the sorted order of the table should be maintained. Additionally, the address 188:44:0 can be used, which is the same address as lookup table entry 1191. However, if the address 188:44:0 is used, its comparison field should be different from entry 1191 so that a different comparison is performed. Notably, the fictitious address does not uniquely represent a node on the network, since it is generated by search engine. The destination address may also be inserted at the point of failure. Turning briefly to FIG. 4, a new table entry is now located at entry 1192. Comparing this table to FIG. 3 shows that entry 1192 of FIG. 3 is moved down to 1193, and all subsequent table entries are similarly moved down. The new table entry 1192 has a network address of 188:45:0. In step 114 this fictitious network address is stored in the table as shown in FIG. 4. In step 116, other information, such as the comparison field and port number, are copied from the matched table entry into the new table entry. For example, returning to the above-described example, the matching address is located at entry No. 1189. Thus, the comparison field for entry No. 1189 and the port number are copied into entry No. 1192. Alternatively, different information can be placed into the comparison field and port number.

Using the method of FIG. 7 and the lookup table of FIG. 4 shows how entering the fictitious addresses expedite the search. If the destination address 188:99:0 is again received by search engine 48, the search fails between 1192 and 1193. Now, entry No. 1192 is the current entry analyzed. The comparison field for entry No. 1192 is applied to the address 188:99:0 (e.g., eight bits), and the modified destination address is 188:0:0. In this implementation, the comparison field is also applied to the network address in the table. Thus, eight bits applied to 188:45:0 results in an address of 188:0:0, which matches the destination address. Thus, by inserting a fictitious address, the search engine examined far fewer network addresses.

Figure 9:
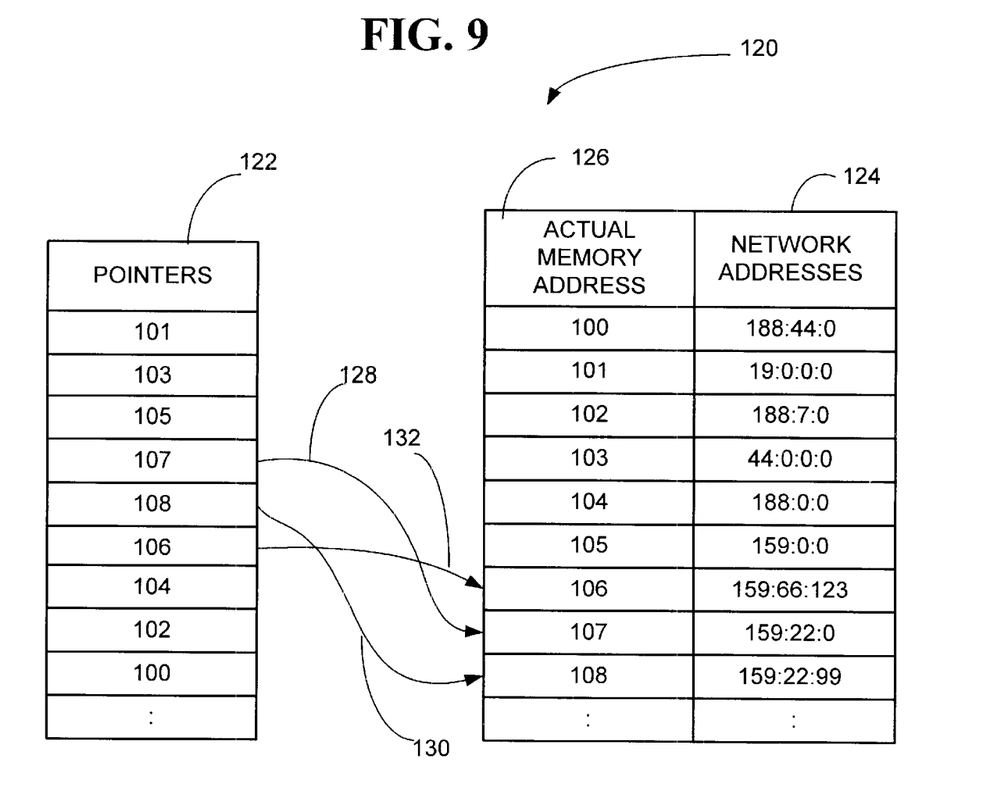
FIG. 9 shows another example of a lookup table using pointers to access the network addresses.

FIG. 9 shows another example of a lookup table 120 that may be used according to the invention. The lookup table includes a list of pointers 122 and network address data 124 stored in memory 50 within the switching device 40. The pointers point to the network address data 124. An example of actual memory addresses is shown in column 126 for illustrative purposes. Notably, neither the network addresses 124 nor the list of pointers 122 are stored in sorted order. However, the contents of data pointed to by the list of pointers 122 are stored in sorted order. For example, a pointer 128 points to address 107, which contains network address 159:22:0. A next pointer 130 in the list points to address 108 which contains the network address 159:22:99. The next pointer 132 points to address 106 which contains the network address 159:66:123. Although the list of pointers 128, 130, and 132 are not in order (since the pointers are 107, 108, 106, respectively) the data pointed to by the pointers is in order since addresses 159:22:0, 159:22:99 and 159:66:123 are in ascending order.

Thus, the lookup table according to the invention does not need to have data stored in contiguous addresses. Instead, network addresses may be in one memory location and payload information (such as port numbers) may be stored in other locations of memory. Pointers or some other technique for linking associated data is then used.

Having described and illustrated the principles of our invention with reference to preferred embodiments thereof, it will be apparent that these embodiments can be modified in arrangement and detail without departing from the principles of the invention.

For example, although the port 42 is shown as including separate components, such components can be formed in a single integrated circuit. Additionally, other circuit components, such as the port intercommunication logic 44 can also be included in the same integrated circuit as the port 42.

Additionally, any of the components of the switching device can be performed by hardware, software, or a combination thereof. The invention should not be limited to the particular technique (whether hardware or software) for carrying out the methods and apparatus described herein. For example, the search engine can be a microprocessor running software or an ASIC where the searches are performed in hardware.

Still further, although the lookup table is shown as containing table entries with multiple fields, the lookup table can be any type of data structure or array that stores data.

Yet further, the network packets can include any kind of data including video images, voice data during a phone call, a document, etc.

Still further, when a port receives a network frame, it can analyze the destination address (at layer two and layer three) and it can also analyze layer 4 policy information if desired.

Still yet further, the present invention may be applied to LAN's, WAN's, the Internet, Intranets, telephone networks, or any other network.

Additionally, although the lookup table is described as containing network addresses, the lookup table may include other keys. A key may include a network address exclusively or in combination with additional information. Alternatively, a key may include lookup information obtained or derived from the network frame other than network addresses. For example, the key may include a data portion of the network frame, such as the URL, the protocol type, the socket type, or the application type (e.g., HTTP, FTP, STP, etc.). Additionally, the switching device may receive network frames that include search keys. Alternatively, the search key may be derived from the network frame. For example, the search engine may use characteristics of the network frame, such as what port it was received on or the protocol used, to derive the search key. The search key, which is either explicitly included in the network frame or derived therefrom, is compared to the lookup table which includes lookup keys. If an exact match is not found, the comparison field can be used as described above and applied to the search key only or in conjunction with the lookup key. Fictitious keys can also be inserted in the lookup table using the techniques described herein.

In view of the many possible embodiments to which the principles or invention may be applied, it should be recognized that the illustrated embodiment is only a preferred example of the invention and should not be taken as a limitation on the scope of the invention. Rather, the invention is defined by the following claims. We therefore claim as the invention all such embodiments that come within the scope of these claims.

We claim:

1. A method of forwarding network frames in a network switching device, comprising the steps of:
providing a lookup table including network addresses and a comparison field associated with the network addresses;
receiving a network frame that includes a destination address;
searching the lookup table to find a network address to analyze;
applying the comparison field to the destination address to determine a portion of the destination address to analyze; and
comparing the network address found in the searching step against the portion of the destination address determined in the applying step.

2. The method of claim 1 further including inserting fictitious addresses into the lookup table to expedite the searching step.

3. The method of claim 1 wherein the lookup table includes addresses of different lengths.

4. The method of claim 1 wherein the lookup table includes collapsed addresses and network addresses.

5. The method of claim 1 wherein the comparison field includes mask bits for masking the destination address or length bits for identifying the bits to be compared.

6. The method of claim 1 wherein the lookup table includes mask bits associated with the network addresses and the method further includes:
searching the lookup table for an exact match between the destination address and a network address;
when an exact match is not found, selecting a first network addresses to be analyzed;
applying the mask bits associated with the first network address to the destination address;
comparing masked destination address to the first network address;
if the masked destination address matches the first network address, obtaining a port number corresponding to the first network address; and
forwarding the network frame over a port associated with the port number.

7. The method of claim 6 further including:
if the masked destination address does not match the first network address; selecting a second network address that is adjacent to the first network address;
applying a second mask associated with the second network address to the destination address;
comparing destination address as modified by the second mask to the second network address;
if the destination address as modified by the second mask matches the second network address; obtaining a port number corresponding to the second network address; and
forwarding the network frame over a prot associated with the obtained port number.

8. The method of claim 1 wherein the comparison field is applied to both the destination address and the network addresses.

9. The method of claim 1 wherein the comparison field includes a length value and further including:
applying the length value to the destination address to determine a number of bits associated with the destination that is to be compared against the network address.

10. In a network switching device having two or more ports that receive network frames and that transmit the network frames towards a final destination, and having a search engine coupled to a lookup table for analyzing the network frames by comparing portions thereof to network addresses stored within the lookup table, an improvement including storing a comparison field associated with entries in the lookup table that is applied to the portions of the network frames or the network addresses in the lookup table to determine a number of bits associated with said portions of the network frames or network addresses that are to be compared.

11. The network switching device of claim 10 wherein the comparison field includes mask bits associated with the network addresses.

12. The network switching device of claim 10 wherein the network addresses are different in length.

13. The network switching device of claim 10 wherein the lookup table includes fictitious network addresses that do not uniquely identify a node on a network.

14. In a network switching device having two or more ports that receive network frames having a destination address embedded therein and that forward the network frames to a final destination on a network, the switching device having a search engine mounted therein that analyzes the network frames by comparing the destination address to network addresses within a lookup table, which is stored within the switching device and coupled to the search engine, an improvement including storing mask bits associated with network addresses within the lookup table, the mask bits being applied by the search engine to at least the destination address of the network frames for comparing the masked destination address to the network addresses or to masked network addresses.

15. The network switching device of claim 14 further including a management processor coupled to the search engine that monitors the lookup table and ensures network addresses are maintained in sorted order.

16. The network switching device of claim 14 further including a switch fabric coupled between the search engine and the ports, the switch fabric for allowing a receiving port to communicate with a transmitting port.

17. The network switching device of claim 14, further including a switching fabric control coupled to the search engine and the switch fabric for coordinating communication between the search engine and the ports.

18. The network forwarding device of claim 17 wherein the switch fabric is a crossbar switch.

19. The network forwarding device of claim 17 wherein the switch fabric is a memory that the search engine stores network frames in and that the transmitting ports receive the network frames from.

20. The network forwarding device of claim 14, wherein the switching device is chosen from a list consisting of a router, a routing switch, a switch, and combinations thereof.

21. The network forwarding device of claim 14, wherein the network addresses include a fictitious address inserted into the lookup table to expedite the searching process.

22. The network forwarding device of claim 14, wherein some of the network addresses stored within the lookup table differ in length from other network addresses stored within the lookup table.

23. In a network switching device having two or more ports for connecting to different portions of a network and having a search engine for analyzing network frames received from the portions of the network and having a lookup table stored in a memory coupled to the search engine, an improvement wherein the lookup table includes network addresses of differing lengths intermingled throughout the lookup table.

24. The network switching device of claim 23 wherein the network addresses are in ascending or descending order within the network address table.

25. A method of forwarding network frames in a network switching device, comprising the steps of:
providing an address lookup table including network addresses;
receiving a destination address from a network;
searching an address lookup table for a match between one of the network addresses and the destination address;
when no match occurs in the searching step, storing a point of failure in the searching step; and
inserting a fictitious address in the lookup table adjacent to or at the point of failure.

26. A method of forwarding network frames in a network switching device, the method comprising the steps of:
providing the lookup table having a network addresses in ascending or descending order and corresponding port numbers and a comparison field for the network addresses;
receiving a network frame including a destination address that the frame is to be forwarded to;
searching the lookup table for a network address that matches the destination address;
if a network address matches the destination address, forwarding the frame to a port number corresponding to the matching network address;
if the destination address does not match any network addresses in the lookup table, then storing a point in the lookup table where the search failed;
choosing a current network address to be analyzed as the network address adjacent to or at the point of failure;
obtaining the comparison field for the current network address; and
applying the comparison field to the destination address to determine a portion of the destination address to analyze.

27. The method of claim 26 further including applying the comparison field to the current network address to determine a portion of the current network address to analyze and comparing the portion of the current network address to the portion of the destination address to see if they match.

28. The method of claim 26 further including comparing the portion of the destination address to the network address.

29. The method of claim 26 further including:
if the masked destination address matches the current network address, forwarding the network frame to the port number associated with the current network address in the lookup table;
if the masked destination address does not match the current network address, analyzing the network address adjacent to the current network address.

30. The method of claim 26 wherein the comparing step further includes applying the mask bits to the current network address so that the current network address is a masked.

31. The method of claim 26 wherein the network frames are received from a computer network.

32. The method of claim 26 wherein the network frames are received from a telephone network.

33. A method of forwarding network frames, the method comprising the steps of:
providing a lookup table including lookup keys;
receiving a network frame;
determining a search key associated with the network frame;
choosing a lookup key from the lookup table to analyze;
obtaining a comparison field associated with the chosen lookup key; and
applying the comparison field to the search key so that only a portion of the search key is analyzed.

34. The method of claim 33 wherein the determining step includes deriving the search key from the network frame based on the characteristics of the network frame.

35. The method of claim 33 wherein the network frame explicitly includes the search key.

36. The method of claim 33 wherein the choosing step includes using a searching algorithm to obtain the current lookup key to analyze.

37. The method of claim 33 wherein the comparison field is a mask field or a length value.

38. The method of claim 33 further including comparing the portion of the search key with the chosen lookup key.

39. The method of claim 33 further including applying the comparison field to the chosen lookup key to obtain a portion of the lookup key to analyze and comparing the portion of the search key to the portion of the lookup key.

* * * * *